Fig. 1

INVENTOR.
George J. Van Hecke

INVENTOR.
George J. Van Hecke.
BY
Harness, Dickey & Pierce
ATTORNEYS.

United States Patent Office 3,105,416
Patented Oct. 1, 1963

3,105,416
PRESSURE CONTROL VALVE FOR HYDRAULIC FASTENER APPLYING TOOLS
George J. Van Hecke, Detroit, Mich., assignor to Huck Manufacturing Company, Detroit, Mich., a corporation of Michigan
Filed Aug. 10, 1960, Ser. No. 48,717
25 Claims. (Cl. 91—335)

This invention relates generally to fluid-operated tools for applying fasteners and more particularly to a valve assembly in such a tool which is operable to control the pressure of the fluid supplied to the tool.

Tools of the type to which this invention relates are usually connected to a remote power source which is operable to provide for a sufficiently high pressure at the tool to completely drive or set the fasteners. However, in some cases only a partial setting of the fasteners is desirable and this can be achieved only by providing for the development of a reduced fluid pressure in the tool. Heretofore, this was accomplished by controlling a valve mechanism in the remote power source and this required the extension of a separate conductor between the tool and the remote power unit. Such an arrangement is objectionable from a standpoint of both safety and cost. It is an object of this invention, therefore, to provide a valve assembly which is mounted on the tool so that it is movable between two positions, one of which provides for a flow of fluid through the valve to the tool for developing the high pressure therein and the other of which provides a bypass return passage to tank to limit the pressure which can be developed in the tool.

For convenience of description, the valve assembly of this invention will hereinafter be referred to as a double drive valve since in a tool which includes the valve of this invention, the tool is operable in one position of the valve to fully set or drive a fastener and in the second position is operable to partially drive or set the fastener. The first position of the valve is hereinafter referred to as the "high" pressure position and the second position is referred to as the "low" pressure position.

It is a further object of this invention to provide an improved hydraulically actuated fastener applying tool which incorporates improved and simplified valve means for controlling the operation thereof.

Another object of this invention is to provide a double drive valve of the above described type which includes structure for adjusting the valve to control the pressure of the low pressure fluid supplied to the tool.

Another object of this invention is to provide a double drive valve that is compact, light in weight, and is readily assembled with fluid-operated fastener applying tools presently in use to convert these tools from single drive to double drive type.

Further objects, features and advantages of this invention will become apparent from a consideration of the following description, the appended claims and the accompanying drawing in which:

FIG. 3 is a longitudinal sectional view of the double drive valve of this invention looking substantially along the line 3—3 in FIG. 2, and showing the valve in a "high" pressure position;

Figure 1:
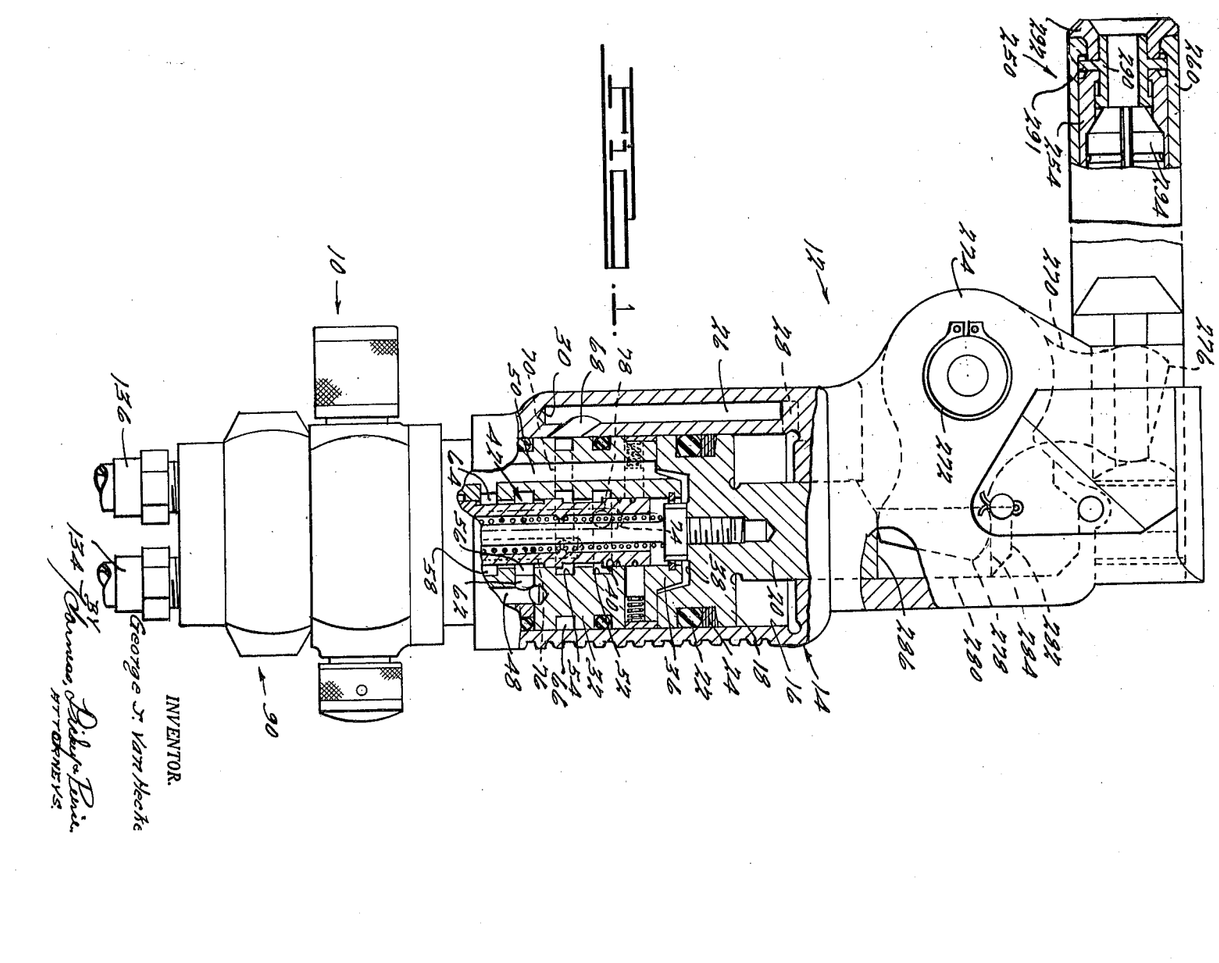
FIGURE 1 is a side elevational view of a fastener applying tool which includes the double drive valve of this invention, with some parts being broken away and other parts shown in section for the purpose of clarity.

With reference to the drawing, one form of the double drive valve of this invention, indicated generally at 10, is illustrated in FIG. 1 incorporated in a hydraulic tool 12 for driving lock bolts, blind rivets and the like. The tool 12 includes a headpiece or hand grip portion, indicated generally at 14, which is provided with a longitudinally extending bore 16. A piston 18 having an integral piston rod 20 extending from one side thereof is mounted for reciprocation in the bore 16 of the headpiece 14, the piston 18 being provided with suitable sealing rings 22 and 24 which form a fluid-tight seal between the piston and the headpiece 14. A longitudinally extending passageway 26 is formed in the headpiece 14 in radially spaced relation with the bore 16. One end of the passageway 26 is connected to the rod end of the bore 16 by a radially inwardly extending port 28 and the opposite end 30 of the passage 26 terminates within the headpiece 14.

Figure 2:
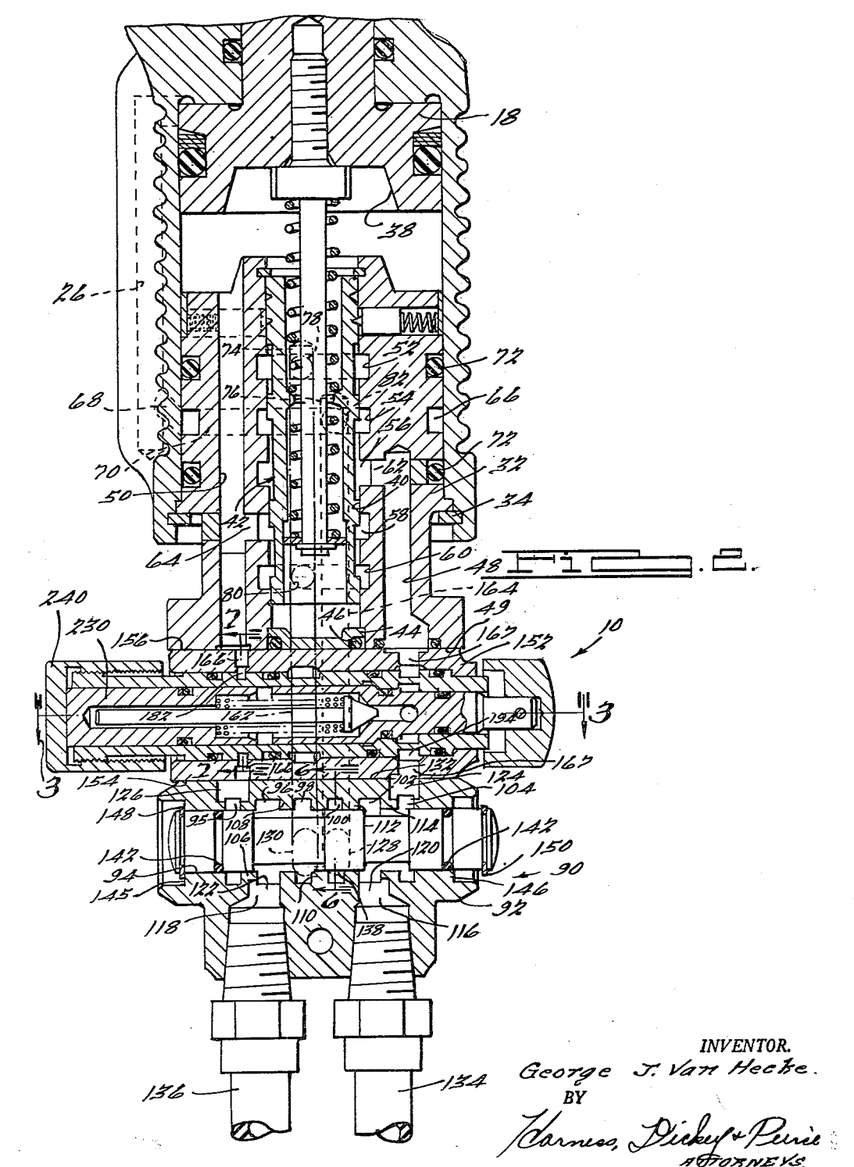
FIG. 2 is an enlarged longitudinal sectional view showing the double drive valve of this invention is assembly relation with the throttle valve and the distributor valve in the tool shown in FIG. 1.

A distributor valve housing 32 is disposed on one side of the double drive valve 10 and extends into the bore 16 in the headpiece 14 and is secured to the headpiece by a snap ring 34 (FIG. 2). The inner end portion 36 of the valve housing 32 is reduced in diameter so that it is of a size to fit in a cavity 38 formed in the head end of the piston 18, sufficient clearance being provided between the piston 18 and the reduced portion 36 of the valve housing 32 to permit the entrance of hydraulic fluid therebetween when the peripheral portion of the piston 18 radially outwardly of the cavity 38 abuts the peripheral portion of the inner end of the valve housing. An axially extending bore 40 is formed in the valve housing 32 for slidably accommodating a distributor valve 42 which is described in detail in my prior application, Serial No. 466,840, filed November 4, 1954, now U.S. Patent No. 2,951,468, granted September 6, 1960. The distributor valve functions to shift the supply of pressure fluid from the head end to the rod end of the piston 18, and vice versa, to provide for a reciprocating motion of the piston 18 in response to a supply of fluid under pressure to the distributor valve 42, which by itself, forms no part of the present invention and is, therefore, not described in detail herein. The end of the bore 40 adjacent the piston 18 is open while the opposite end of the bore 40 is closed by a closure member 44, a sealing ring 46 being provided to insure a fluid-tight seal between the closure member 44 and the housing 32.

A longitudinally extending inlet passage 48 is formed in the housing 32 at a position spaced radially outwardly with respect to the bore 40 and a longitudinally extending outlet passageway 50 is provided in the valve housing 32 at a position diametrically opposite the inlet passageway 48 and in a radially outwardly spaced relation with the bore 40, the longitudinal axes of the inlet passageway 48 and the outlet passage 50 being substantially parallel to the longitudinal axis of the bore 40. The passages 48 and 50 extend through the outer face 49 of the housing 32. A plurality of longitudinally spaced annular grooves 52, 54, 56, 58 and 60, are formed in the inner wall of the valve housing 32 and the inlet passage 48 is connected to the groove 56 by a radially extending port 62, and the outlet passage 50 is connected to the groove 58 by a radially extending port 64.

An annular groove 66 is formed in the outer wall of the valve housing 32 which is substantially concentric with the groove 54 and is connected to the passage 26 by a port 68 in the headpiece 14 and to the groove 54 by a radially extending port 70. Sealing members 72 are positioned between the valve housing 32 and the inner wall of the headpiece 14 for the purpose of forming a fluid-tight seal between the valve housing and the headpiece.

The valve housing 32 is also formed on substantially diametrically opposite sides thereof with longitudinally extending ducts 74 and 76 which are spaced radially outwardly of the bore 40. The duct 74 communicates with the groove 52 by means of a cross port 78 and with the groove 60 by means of a cross port 80. The duct 76 communicates with the groove 74 by means of a cross port 82.

Disposed on the side of the double drive valve 10 opposite the distributor valve housing 32 is a throttle valve 90 which includes a housing 92 secured to the housing 32 by bolts 160 (FIG. 3) which are substantially parallel to the bore 40. The throttle valve housing 92 is formed with a bore 94, the longitudinal axis of which extends transversely of the longitudinal axis of the bore 40 in the valve housing 32 and a spool member 93 is slidably fitted in the bore 94. A plurality of longitudinally spaced annular grooves 95, 96, 98, 100, 102 and 104, are formed in the inner wall of the housing 92 and are separated by lands 106, 108, 110, 112 and 114. Inlet and outlet pipe fitting socket openings 116 and 118, respectively, are formed in the throttle valve housing 92, the inlet opening 116 being connected to the groove 102 by a port 120 and the outlet opening 118 being connected to the groove 96 by a port 122. An outlet opening 124 is formed in the housing 92 at a position diametrically opposite the inlet port 120 and communicates with the groove 104 which is separated from the port 120 by the land 114. A return port 126 is substantially diametrically opposite the outlet port 122 and communicates with the groove 95 which is spaced from the port 122 by the land 106.

Figure 6:
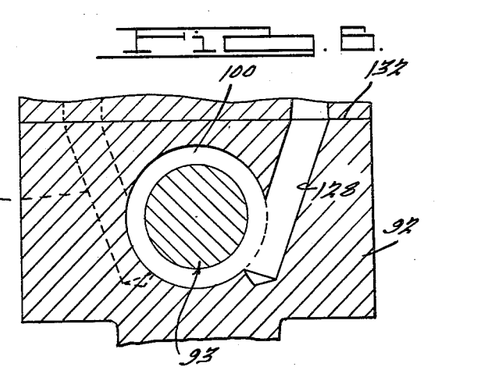
FIG. 6 is an enlarged transverse sectional view of the throttle valve.
Figure 7:
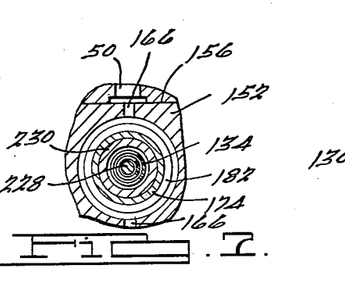
FIG. 7 is a transverse sectional view of the double drive valve of this invention, looking substantially along the line 7—7 in FIG. 2.

The housing 92 is also formed with a pair of inclined passages 128 and 130 (FIG. 6) which communicate with the grooves 100 and 98, respectively, and terminate in the face 132 of the valve housing 92. A supply line 134 which communicates with a suitable source of fluid under high pressure is connected to the inlet opening 116 and a return line 136 is connected to the outlet opening 118, the return line serving to return the fluid to the source.

The spool 93 which is slidably mounted in the bore 94 for the throttle valve 90 is provided with a pair of relatively wide annular grooves 137 and 139 which are separated by a land 138 and lands 140, 142, of substantially the same diameter as the diameter of the land 138 are provided at opposite ends of the spool 93. Sealing rings 144 are disposed in the lands 140 and 142 to provide a fluid-tight fit of the lands 140 and 142 with the bore 94 of the housing 92. The outer end portions of the bore 94 are enlarged to form recessed shoulders 145 and 146 and retaining rings 148 and 150 are fitted on the spool 93 at positions near the ends thereof, the distance between the rings 148 and 150 being greater than the distance between the shoulders 144 and 146 so that longitudinal movement of the spool 93 is permitted, the rings 148 and 150 abutting the shoulders 145 and 146, respectively, to limit the axial movement of the spool 93.

When the throttle valve spool 93 is moved to the "on" position of the throttle valve shown in FIG. 2, so that the ring 148 abuts the shoulder 145, the land 138 is aligned with the land 112 so that a fluid-tight seal is formed between the grooves 100 and 102 and fluid can flow from the inlet port 120 through the groove 139 around the spool 93 to the outlet opening 124. The land 138 is of a width such that in this position of the spool it is also radially aligned with the land 110 so as to provide a fluid-tight seal between the grooves 98 and 100 and block communication of the passages 128 and 130. Fluid entering the groove 95 in the housing 92 from the opening 126 is blocked by the land 140. Fluid entering the groove 98 from the passage 130 can flow through the groove 137 in spool 93 to the port 122 for flow out the outlet opening 118.

Figure 5:
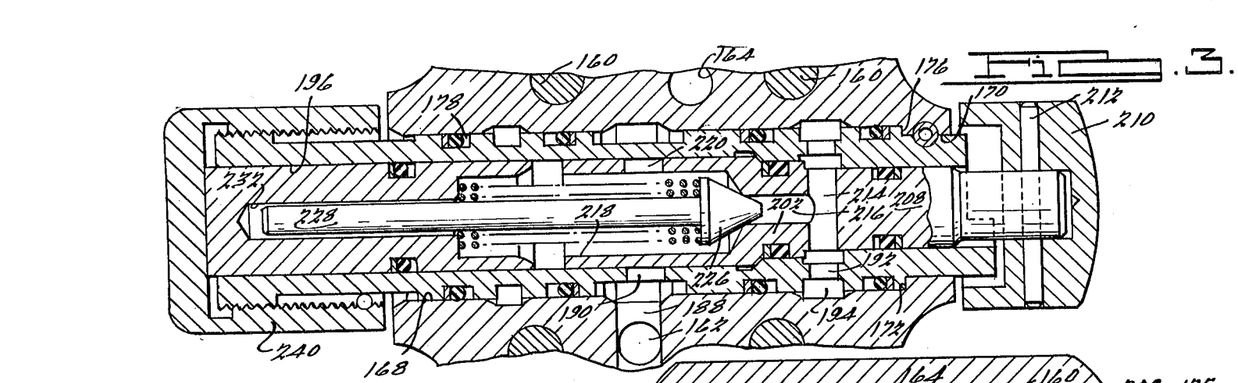
FIG. 5 is a sectional view of the throttle valve in the tool shown in FIG. 2 showing the valve in a changed position relative to the position shown in FIG. 2.

When the throttle valve 90 is moved to the "off" position so that the ring 150 abuts the shoulder 146 as shown in FIG. 5, the land 142 is in a sealing relation with the land 114 so as to block communication of the inlet port 120 with the outlet opening 124. Fluid entering the housing 92 through the inlet port 120 flows through the groove 139 in the spool 96 to the groove 100 in the housing 92 for flow into the passage 128 which is separated from the passage 130 by the land 138 which is in a sealing relation with the land 110 on the housing 92. Fluid entering the housing 92 through the port 126 and the passage 130 can flow around the spool 93 through the groove 137 to the opening 122 for flow out the outlet opening 118.

The double drive valve 10 consists of a housing 152 having oppositely disposed flat faces 154 and 156 which are adapted to be positioned in abutting relation with the face 132 on the throttle valve housing 92 and the face 49 on the distributor valve housing 32, respectively. The double drive valve housing 152 is provided with through holes which extend between the faces 156 and 154 for receiving the bolts 160 (FIG. 4) which connect the housing 92 to the housing 32. The double drive valve housing 152 is also provided with a pair of through passages 162 and 164 which are aligned with the passages 74 and 76, respectively, in the distributor valve housing 32 and the passages 130 and 128, respectively, in the throttle valve housing 92. A through passage 166 in the housing 152 communicates at the face 156 with the passage 50 in the distributor valve housing 32 and at the face 154 with the passage 126 in the throttle valve housing 92, and a through passage 167 communicates at the face 154 with the throttle valve port 124 and at the face 156 with the inlet passage 48 in the valve housing 32.

The double drive valve housing 152 is formed with a longitudinally extending bore 168 which is parallel to the bore 94 in the throttle valve housing 92 and perpendicular to the bore 40 in the distributor valve housing 32. One end of the bore 168 is of a reduced diameter, as indicated at 170 so as to form a shoulder 172 at the juncture of the portion 170 with the remainder of the bore 168. A hollow sleeve 174 is disposed in the bore 168 in a press-fit relation therewith and in a position in which a shoulder 176 on the sleeve 174 abuts the bore shoulder 172. A conventional lock pin 175 extends through the housing 152 and a groove in one side of the sleeve 174 for fixing the sleeve 174 in the housing 152 so that the sleeve 174 in effect constitutes part of the housing 152. The external surface of the sleeve 174 is formed with four longitudinally spaced annular grooves 178 and a seal member 180 is positioned in each of the grooves to provide a fluid-tight seal between the housing 152 and the sleeve 174 at each of the grooves 178. Between one pair of adjacent grooves 178, the sleeve 174 is formed with an external annular groove 182 which communicates with the through passage 166 in the valve housing 152. Between another pair of adjacent grooves 178, the sleeve 174 is formed with another external groove 186 which communicates through a side passage 188 in the housing 152 with the through passage 162 in the housing 152. A port 190 in the sleeve 174 provides for a fluid communication of the interior of the sleeve with the groove 186. Adjacent the shoulder 172 and between another pair of adjacent grooves 178, the sleeve 174 is formed with a through opening 192 which communicates at its ends with an annular external groove 194 formed in the sleeve 174 that in turn communicates with the through opening 167.

The sleeve 174 is provided with a longitudinally extending bore 196 which is formed intermediate its ends with a pair of relatively closely spaced transverse shoulders 198 and 200. A valve body member 202 is rotatably mounted in a portion of the bore 196 and engages the shoulders 198 and 200. Between the shoulders 198 and 200, the body member 202 is formed with an external groove 204 in which a seal member 206 is positioned. The body member 202 has an axially extending stem portion 208 which projects through one end 211 of the sleeve member 174 and has an actuating knob 210 secured thereto by a transversely extending pin 212 and located axially outwardly of the end 211 of the sleeve 174. The stem portion 208 has a groove 207 which is spaced from the groove 204 and a seal 209 is disposed in the groove 207 to provide a fluid-tight seal between the stem and the sleeve 174.

Between the seals 206 and 209, the stem portion 208 is provided with a transverse passage 214 which is radially aligned with an internal groove 215 in sleeve 174 and is alignable with the opening 192 in the sleeve member 174. The passage 214 communicates intermediate its ends with one end of a longitudinally extending passage 216 in the body member 220. At its opposite end the passage 216 communicates with the inner end of an axial cavity 218 formed in the end of the body member 202 remote from the stem 208. A transverse port 220 extends through the wall of the cavity 218 and in one position of the body member 202, is aligned with the port 190 in the sleeve 174.

At the inner end of the cavity 218, the body member 202 is formed with an annular sloping surface 222 which intersects one end of the passage 216 so as to form a valve seat 224. A frusto-conical valve member 226 has a stem 228 and is adapted to seat on the seat 224. A valve guide or holding member 230 is slidably received within the outer end of the bore 196 and has a blind opening 232 formed therein which receives the valve stem 228. A pair of coil springs 234 are positioned coaxially about the valve stem 228 and extend between the valve member 226 and a cavity 236 formed in the adjacent end of the guide member 230 in a coaxial relation with the blind hole 232. It is apparent that the position of the valve guide and holding member 230 in the bore 196 determines the extent of compression of the springs 234 to in turn determine the fluid pressure force which must exist in the passage 216 in order to move the valve member 226 off its seat 224. A retainer cap 240 is threadably mounted on the outer end 242 of the valve sleeve 174 so that upon adjustment of the cap 240 toward or away from the valve housing 152, the position of the valve guide member 230 in the bore 196 is adjusted. As the cap 240 is backed off on the sleeve portion 242, in a direction away from the housing 152, the pressure exerted by the springs 234 on the valve member 226 is reduced.

It is seen, therefore, that by virtue of the rotatable mounting of the body member 202 in the sleeve 174, the body is movable to a position in which the port 220 is aligned with the port 190 (FIG. 4) or the body 202 can be moved to a position closing the port 190 (FIG. 3). A pin 241 on the body member actuating knob 210 strikes stops 243 which are spaced one hundred and eighty degrees apart and only one of which is shown, on the end 211 of the sleeve 174 to define these positions of the body member 202.

Figure 8:
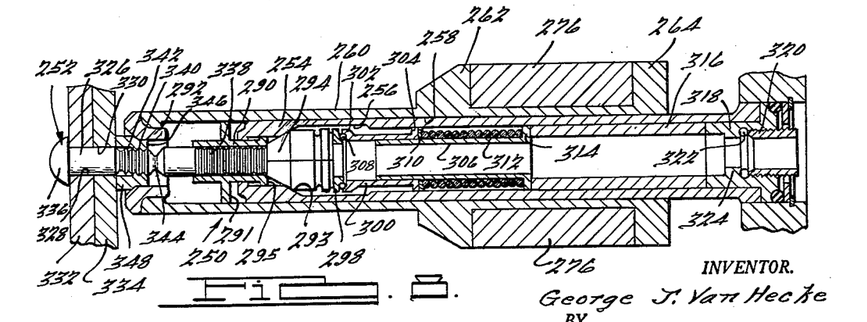
FIG. 8 is a fragmentary sectional view of the nose piece of the tool shown in FIG. 1 illustrating the application of the nose piece to a fastener to be driven with the tool.

In the use of the tool 12, the nosepiece, indicated generally at 250 (FIG. 8) for the tool 12 is applied to a fastener, such as the one illustrated at 252 in FIG. 8. The nosepiece 250 includes an elongated tubular collet 254 defining a longitudinally extending bore 256 and fixed on the headpiece 14. An elongated anvil holder 260 having an axial bore 258 is slidably mounted on the collet 254, the anvil holder having a pair of longitudinally spaced flanges 262 and 264 projecting radially outwardly therefrom. The tool 12 has a rocker arm 270, oscillatably mounted on a bearing 272 carried by flange members 274 on the headpiece 14, which is provided with a pair of angularly spaced bifurcated arms 276 and 278. The piston rod 20 is reduced in thickness as indicated at 280 at a position spaced from the end 282 thereof and the arm 278 of the rocker arm 270 is positioned over the reduced portion 280 of the piston rod 20 so that the outer end portion of the arm 278 bears against the shoulders 284 and 286 at the ends of the reduced portion 280. The bifurcated arm 276 of the rocker arm 270 is fitted over the anvil holder between the flanges 262 and 264, the outer end surfaces of the arm bearing against the opposite surfaces of the flanges. With such a construction, oscillation of the rocker arm 270 causes the anvil holder 260 to slide longitudinally of the collet 246.

The end portion of the collet 254 is reduced in diameter and a chuck expanding sleeve 290 is positioned therein. The sleeve 290 has a radial flange 291 intermediate its ends which slidably supports the sleeve 290 in the holder 260. A swaging anvil 292 is supported on the outer end of the anvil holder 260. The inner surface of the swaging anvil 292 is tapered adjacent the terminal end thereof for swaging purposes. The collet has a tapered internal shoulder 293 and a multiple jaw chuck 294, which is shaped generally in the form of a truncated cone, is positioned in the bore 256 in engagement with the shoulder 293. The jaws in the chuck 294 are held in engagement with the shoulder 293.

A tubular follower cap 298 having a radially outwardly projecting flange on one end thereof is fitted in the bore 256 of the collet, so that the flange bears against the enlarged end of the jaw assembly 294. An elongated follower member 300 having radially outwardly projected flange portions 302 and 304 at the ends thereof is slidably mounted on a follower sleeve 306 fitted in the bore 256 of the collet 254. The flange 302 at one end of the follower member 300 bears against a bumper ring 308 which is interposed between the follower member 300 and the follower cap 298. The flange 304 at the opposite end of the follower member 300 bears against a washer 310 slidably mounted on the follower sleeve 306 and the washer 310 in turn bears against one end of a column of O-rings 312 fitted over the follower sleeve 306. The end of the column of O-rings 312 remote from the washer 310 bears against a radially outwardly projecting flange 314 formed on one end of the follower sleeve 306.

One end of a tubular spacer 316 bears against the flange 314 of the follower sleeve 312 while the opposite end of the spacer 316 bears against the inner end of a screw housing 318 fitted in the bore 256 of the collet 254 at a position adjacent the inner end thereof. The screw housing 318 is provided with internal threads adapted to threadedly engage an externally threaded tubular adjusting screw 320, the inner end of which bears against a resilient ring-shaped bumper 322 which is interposed between the adjusting screw 320 and a radially inwardly projecting flnage 324 on the housing 318.

The fastener 252 is illustrated as consisting of a headed pin 326 which is extended through substantially aligned openings 328 and 330 in a pair of plates or sheets 332 and 334, so that the head 336 on pin 326 engages one side of the plate 332. The pin 326 has a shank portion 338 which is formed with pull grooves adapted to be gripped by the chuck 294. Spaced upon the head 336 the pin 326 is formed with a plurality of lands 340 which are separated by locking grooves 342. A breakneck groove 344 is formed in the pin 326 between the lands 340 and the shank 338.

The fastener 252 is driven by first telescoping the nosepiece 250 over the shank 338 so that the shank 338 is telescoped within the chuck 294. The anvil 292 engages the outer end 346 of a collar 348 positioned on the pin 326 so that it extends about the lands 340 and engages the outer side of the plate 334. The spool 93 in the throttle valve 90 is moved to the "on" position, illustrated in FIG. 2, so that fluid under pressure from the line 134 flows through the throttle valve port 124 into the one end of the passage 167 in the double drive valve housing 152. From the passage 167, the fluid flows into the groove 194 in the sleeve 174, and into the passage 214 in the valve body 202. Fluid also flows from the groove 194 out of the valve housing 152 through the opposite end of the passage 167 into the inlet passage 48 in the distributor valve housing 32. Since the anvil 292 is initially retracted relative to the chuck 294 the piston 18 is in the position shown in FIG. 1.

The fluid entering the housing 32 through the inlet passage 48 travels through the port 62 into the groove 56, and through the bore 40 to the groove 58 for flow through the port 64 into the passage 50. This fluid then moves the piston 18 in a direction away from the housing 32 to rotate the rocker arm 270 in a direction to move the anvil 292 away from the chuck 294. This results in first a contraction of the chuck 294 into gripping engagement with the shank 338 so that the pin 326 is pulled through the openings 328 and 330 followed by swaging of the collar 348 onto the pin. Fluid is exhausted from cylinder bore 16 on the opposite side of the piston 18 through the passage 26, port 68, groove 66, passage 70, bore 40, and transverse passage 78 into the passageway 74 for flow through the passage 162 in the valve body 152 and the passage 130 in the valve housing 92 into the outlet passage 118. The land 138 on the valve spool 93 closes the passage 128 which communicates with the passage 76 in the valve housing 32 for preventing flow of fluid through passage 76.

When the piston 18 has reached the end of its stroke in a direction away from valve body 32, the distributor valve 42 is automatically shifted to the position shown in FIG. 2 so that the fluid under pressure which is flowing into the inlet passage 48 flows through the port 62 into the groove 56, through the bore 40 to the groove 54, through passage 70 to groove 66, through the passage 68 into the passage 26, and through the passage 26 to the cylinder bore 16 on the rod side of the piston 18 so as to move the piston toward valve body 32. Fluid is exhausted from the cylinder bore 16 on the opposite side of the piston 18 through the passageway 50, to the port 64, into the bore 40, the groove 60, and the transverse port 80 into the passageway 74 for flow through the passageway 162 in the valve body 152 into the passage 130 in the valve housing 92, and thence through the bore 94 in the housing 92 to the outlet opening 118. When the piston 18 has reached the end of its stroke in a direction toward the valve housing 32, the valve 42 is shifted to the FIG. 1 position so that fluid from passage 48 is again directed to the bore 16 on the head side of piston 18.

The distributor valve 42 thus operates in the manner disclosed in my copending application hereinbefore referred to so as to provide for a continuous reciprocation of the piston 18 in the cylinder bore 16 in response to a supply of fluid under pressure to the passage 48. This effects a continual reciprocation of the anvil 292 relative to the chuck 294 so that as the operator exerts pressure on the headpiece 14 so as to move it toward the plate 334, the chuck 294 is advanced on the shank 338 and the anvil 292 is advanced on the collar 348 so as to progressively swage the collar 349 onto the grooves 342 in the pin 326.

In the event it is desired to fully swage collar 348 onto the pin 326, the knob 210 is rotated to move the valve body 202 to the position illustrated in FIG. 3. In this position of the valve body 202, the fluid under pressure in the passage 214 will unseat the valve member 226 and flow into the cylindrical space or passageway defined by the cavities 218 and 236. However, the valve body 202 blocks communication of cavity 218 with port 190, so that this fluid is trapped in the cavities 218 and 236 and the double drive valve 10 has no effect on the pressure of the fluid supplied to the inlet passage 48 in the valve housing 32 from the inlet line 134. Consequently, the fluid force developed on the piston 18 is of sufficient magnitude to provide for a pull on the pin 326 sufficient to fracture pin 326 at groove 344, signaling a complete swaging of collar 348 into locking grooves 342.

Figure 4:
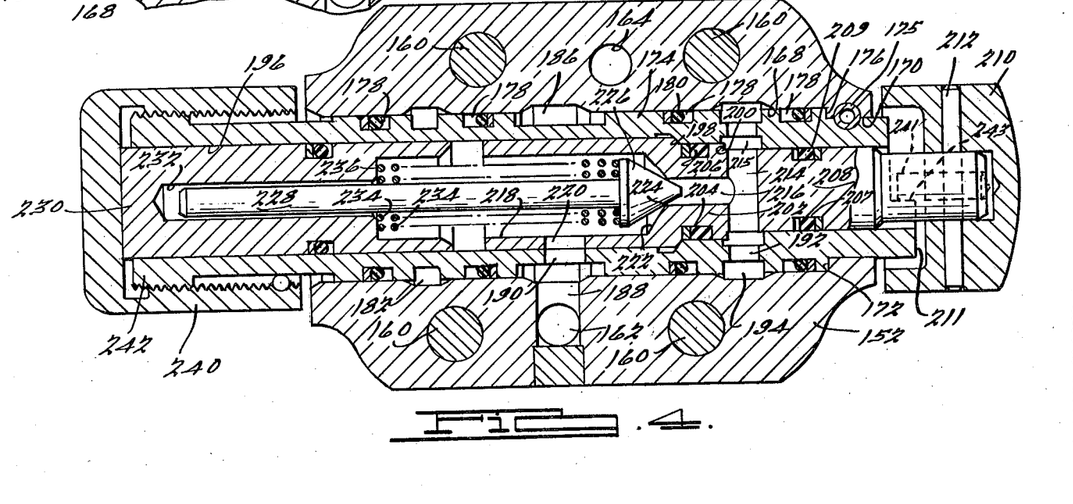
FIG. 4 is a longitudinal sectional view of the double drive valve of this invention illustrated similarly to FIG. 3, and showing the valve in its "low" pressure position.

In the event only a partial driving of the fastener 252 is desired, as for example, in cases where one or a plurality of fasteners 252 are first used to hold the plates 332 and 334 in a connected relation following which the plates are finally positioned in the positions in which they are to be connected and then the driving of the fastener 252 is completed, the actuating knob 210 for the double drive valve 10 is moved to the position shown in FIG. 4 so as to align the port 220 on the valve body 202 with the port 190 in the sleeve 174. With the double drive valve 10 in this position, the fluid under pressure entering the passage 214 from the throttle valve 90 unseats the valve member 226 so that some of the fluid flows through the aligned ports 220 and 190, the port 188 and the passage 162 into the passage 130 in the throttle valve housing 92 for return flow through the outlet opening 118 to the tank at the remote power source.

As a result, the valve member 226 functions as a relief valve to limit the presure of the fluid flowing into the inlet passage 48 in the distributor valve housing 32. Consequently, the fluid pressure force which is exerted on the piston 18 is limited so that the swaging force applied to the anvil 292 is likewise limited. The adjustable retainer cap 240 on the double drive valve 10 is adjusted to adjust the force exerted on the valve member 226 by the springs 234 to in turn adjust the pressure of the fluid flowing into the inlet passageway 48 so that this swaging force at the anvil 292 is insufficient to fully swage the collar 348 and break the pin 326 at the break neck groove 344. In other words, the tool 12 merely stalls on the fastener 252 with only the end 346 of the collar 348 swaged into the locking grooves 342 in the pin 326.

In other words, when the resistance of the collar 348 to further swaging equals the total force of the tool applied to the swaging anvil 292, the piston 18 stops and all of the fluid flowing into the double drive valve housing 152 through the port 124 in the throttle valve housing 92 is returned to tank through the passage 214 in the valve body 202, the passage 216, the cavity 218, aligned ports 220 and 190, passageway 188, passage 162, passage 130, valve housing 92, and outlet opening 118. For this reason, it is important that all of these passages be of a size to accommodate the volume of fluid flowing into the valve housing 152. In order to remove the nosepiece 250 from the partially driven fastener 252, it is necessary to retract the anvil 292 relative to chuck 294. This is accomplished by moving the throttle valve spool 93 to the "off" position illustrated in FIG. 5.

In this position of valve 90, fluid under pressure from the line 134 flows around the spool 93 into the passage 128 and flows through the passage 128, the passage 164, the passage 76, the transverse port 82, the groove 54, passage 70 and groove 66, the passage 68, and the passage 26 into the cylinder bore 16 on the rod end of the piston 18 so as to move the anvil 292 to its retracted position. In this position it is in readiness for the next fastener driving operation. Fluid on the opposite side of the piston 18 is exhausted through the passage 50, opening 166, port 126, around the spool 93 and to the outlet opening 118. Since the piston 18 stalled during movement in a direction away from valve housing 32 to advance anvil 292, the valve 42 is in the FIG. 1 position in which the groove 54 communicates with the groove 52 through the bore 40 so that fluid under pressure from passage 76 is returned through the passage 74 to the passage 130 in the throttle valve housing 92 for flow around the spool 93 to the outlet opening 118.

The return path for fluid from passage 82 through passage 74 is sufficiently restricted relative to the passage 76 such that sufficient pressure is developed in bore 16 on the rod side of piston 18 to return the piston 18 to the position at the end of its stroke for retracting anvil 292. During the final retracting movement of the anvil 292 it engages the sleeve flange 291 and moves the sleeve 290 to the right as viewed in FIG. 8 so that the inner end 295 of the sleeve 290 engages the chuck 294 and moves it inwardly of the collet 254 to a position in which it is movable radially outwardly on the shoulder 293 so as to expand the axial opening therein and release it from the fastener shank 338. The chuck 294 is shown in an expanded release position in FIG. 1.

When a full swaging of the previously partially swaged collar 348 is desired, the throttle valve 90 is moved to the "on" position shown in FIG. 2 and the actuating knob 210 is moved to the position illustrated in FIG. 3 so that the double drive valve 10 does not affect the pressure of the fluid supplied to the tool 12 from the inlet line 134. The swaging force applied to the anvil 292 is then sufficient to fully swage the collar 348 into the locking grooves 342 following which the pin 326 is broken at the breakneck 324. The broken-off pintail then travels rearwardly through the chuck assembly 294, the sleeve 300, the follower sleeve 306, the tube 316, and the adjusting screw 320.

When use of the tool 12 is to be discontinued, throttle valve spool 93 is moved to the "off" position illustrated in FIG. 5, resulting in automatic retraction of anvil 292 so that tool 12 is in readiness for another fastener driving operation.

A form 10 of the double drive valve of this invention has been described which is assembled with a tool 12 of the type in which the anvil 292 and the chuck 294 reciprocate relative to each other continuously when the throttle valve 90 is in the "on" position so that the tool 12 is being supplied with fluid. In FIGS. 9–13, a form indicated generally by the numeral 400, of the double drive valve of this invention is shown assembled with a tool 402 of a type which has an anvil 404, an expandable chuck 406 like the chuck 294, and a trigger 408, which must be actuated to provide for each relative movement of the anvil 404 and the chuck 406. In other words, the tool 402 is connected to a remote power unit, as shown in my prior applications Serial No. 729,349, filed April 18, 1958, now U.S. Patent No. 3,052,099, granted September 4, 1962; and Serial No. 819,402, filed June 10, 1959, now U.S. Patent No. 3,001,548, granted September 26, 1961, and the trigger 408, which is adapted to be electrically connected to the remote power unit by a connector 409, must be actuated to move the chuck 406 away from the anvil 404 and again to move the chuck 406 toward the anvil 404.

The tool 402 consists of a hollow headpiece 410 formed with a bore 412, a handle 414 which is secured to the headpiece 410 by four bolts 416 (FIGS. 10–13) which extend through the double drive valve 400 so as to position the double drive valve 400 between the headpiece 410 and the handle 414, and a self-releasing nose assembly 418 which is removably mounted on the headpiece 410. A piston 420 is slidably mounted in the bore 412 which is partially closed at its open end by an annular sealing ring 422 which carries a plurality of seals 424 on its radially inner side. The piston 420 has a piston rod 426 which projects through the seals 424 and is guidably supported on a member 428 that is secured to and constitutes a tubular extension of the headpiece 410. The extension member 428 has a tubular portion 430 supported in a cap 431 on the open end of the headpiece 410 and a radially extending annular flange 432 on one end which supports the piston rod 426 and is secured within the headpiece bore 412 by a retaining ring 436.

The piston 420 is movable in the bore 412 between two extreme positions one of which is illustrated in which the piston 420 is adjcent the sealing ring 422. In its other extreme position, the piston 420 is positioned adjacent the closed end 438 of the headpiece bore 412. A first passage 440 in the headpiece 410 communicates through a port 442 with the bore 412 on the rod end of the piston 420. A second fluid passage 444 in the headpiece 410 communicates through a port 446 with the bore 412 on the opposite or head end of the piston 420. The passage 440 communicates through the valve 400 with a passage 448 in the handle 414 which in turn communicates through a line 450 with the remote power unit. A line 452 is connected to the handle 414 at a position adjacent the line 450 and is also connected to the remote power unit which is operable to force fluid through either of the lines 450 or 452 and connect the other line to tank. The line 452 communicates with a passage 453 in the handle 414 which is in turn connected through the valve 400 with the passage 440 in the headpiece 410.

The self-releasing nose assembly 418 consists of an elongated anvil holder 454 which is integrally formed at one end with the swaging anvil 404, and is formed with an elongated longitudinally extending bore 456. At its opposite end, the anvil holder 454 is releasably connected to the headpiece extension 428 by a split ring 458 which has edge flanges 460 and 462 that extend inwardly on opposite sides of an annular flange 464 on the anvil holder 454 and a flange 466 on the terminal end of the tubular portion 430 of the extension member 428. A retainer sleeve 468 is slidably mounted on the split ring 458 for maintaining it in a connecting position on the extension member 428 and the anvil holder 454, and a retainer ring 470 is mounted on the anvil holder 454 for maintaining the retainer sleeve 468 in a retaining position. Slidably mounted within the anvil holder bore 456 is an elongated tubular collet 472 which is formed adjacent one end with an annular inclined shoulder 474 which is inclined inwardly toward the axis of the collet 472. The opposite end of the collet 472 is threaded onto the piston rod 426 so that it is movable therewith. A follower sleeve 476 is slidably mounted within the collet 472 and is urged toward the chuck 406, to in turn urge the chuck 406 toward the shoulder 474, by a plurality of compressible annular springs 478 which function like the O-rings 312 in the nose assembly previously described. A follower cap 480 is positioned between the sleeve 476 and the expandable chuck 406. The sleeve 476 urges the expandable chuck 406 against the inclined shoulder 474 so as to contract the chuck 406. When the chuck 406 is moved rearwardly, against the pressure of the springs 478, it is also movable radially outwardly on the inclined shoulder 474 so as to expand the chuck. A chuck expanding sleeve 482 is slidably mounted on the outer end of the collet 472 and has an intermediate radial flange 484 engageable with the inner side of the anvil 404. When the collet 472 is moved to the limit position illustrated in FIG. 9 in which it engages the flange 484, the inner end 486 of the sleeve 482 engages the chuck 406 and acts to move the chuck 406 rearwardly on the inclined shoulder so that the chuck 406 is expandable to release it from the shank of a fastener like the fastener 252. When the chuck is expanded, an ejector cylinder 488 is movable axially through the chuck 406 for ejecting the broken-off portion of a fastener gripped in the chuck 406.

The ejector cylinder 488 is supported in a guide sleeve 490 which is in turn slidably supported on a support sleeve 491 which is mounted co-axially within the collet 472 and within the springs 478. An ejector rod 492 slidably supported in a disk 494 at the inner end of the support sleeve 492 is movable axially of the collet 472 into a cavity 496 in the ejector cylinder 488 for moving the cylinder 488 in a direction outwardly of the collet 472. The rod 492 carries a piston 498 at its inner end which is slidably supported within a bore 500 formed in the piston rod 426 and extended through the piston 420. One end of the bore 500 is closed by a plug 502 which also slidably supports the ejector rod 492 and a valve assembly 504 is mounted in the opposite end of the bore 500.

The valve assembly 504 consists of an annular seat member 506 mounted in the piston 420 and formed with an axial cavity 508 having an annular seat 510 on its inner end and lateral openings 509 at its outer end. A valve member 512 extends into the bore 500 and the cavity 508 and is formed intermediate its ends with an inclined shoulder 514 engageable with the valve seat 510. A spring 516 extends between a shoulder on the piston rod 426 and an opposite shoulder on the valve member 512 for urging the shoulder 514 into engagement with the valve seat 510. The valve member 512 projects beyond the piston 420 so that the end 518 thereof is engageable with a projection 520 on the headpiece 410. On engagement of the end 518 of the valve member 512 with the projection 520, the shoulder 514 is moved off the seat 510 against the pressure of spring 516 so that a fluid path consisting of a passage 522 in the pitson 420, the cavity 508 and the passages 509 extends between opposite ends of the piston 420 to equalize the pressure on the piston ends. An axial passage 524 in the valve member 512 provides for a constant communication of the piston rod bore 500 with the headpiece bore 412 on the head end of the piston.

Figure 9:
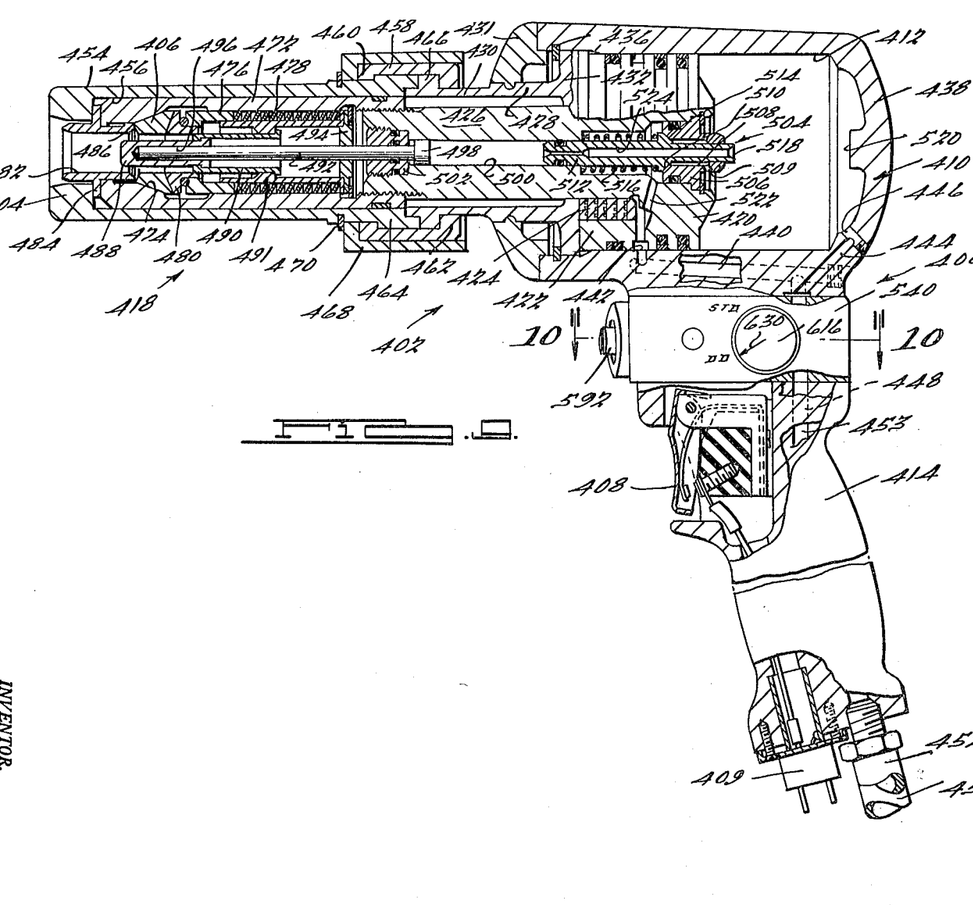
FIG. 9 is a side elevational view of another form of fastener applying tool which includes a modified form of the double drive valve of this invention, with some parts broken away and other parts shown in section for the purpose of clarity.

Fluid is pumped through the line 450 to the passage 440 to develop a pressure in the headpiece bore 412 on the rod end of the piston 420 which is operable to drive the piston toward the right as viewed in FIG. 9, to force fluid out of the headpiece bore 412, which functions as a cylinder for the piston 420, through the passage 444 and the line 452 to tank. The phrase "to tank" refers to a fluid reservoir disposed on the low pressure side of the fluid pump used to provide the fluid pressure to the line 450. The passage 440 thus functions as an inlet passageway during driving of the piston 420 to drive a fastener. Movement of the piston 420 in this direction is operable to move the collet 472 toward the right, since it is threaded onto the piston rod 426, so that the engagement of the collet shoulder 474 with the chuck 406 contracts the chuck into gripping engagement with the grooved shank 338 of a fastener such as the fastener shown at 252 in FIG. 8. Movement of the piston 420 toward the right continues until either the trigger 408 is actuated to connect the line 450 with tank or the end 518 of the valve member 512 strikes the projection 520 so as to move the shoulder 514 off the seat 510 so that the fluid under pressure on the rod end of the piston 420 merely flows through the piston cavity 508 to return to the tank through the line 452.

With the piston 420 adjacent the closed end 438 of the bore 412, when fluid is pumped through the line 450 to the passage 444, the piston 420 is moved toward the left and fluid is supplied to the piston rod bore 500 so that a fluid pressure is applied to the piston 498 sufficient to move the ejector rod 492 against the ejector cylinder 488 which in turn engages the broken-off portion of the fastener in the chuck 406 so as to exert an axial force on the fastener portion tending to eject it from the nose piece 418. When the collet 472 has been moved to a position in which the end 486 of the chuck expanding sleeve 482 engages the chuck 406 and moves it rearwardly away from the shoulder 474 the chuck is expandable so as to release it from a broken-off fastener portion, and the ejector cylinder 488 is operable to eject the fastener portion in the chuck 406.

The double drive valve 400 includes a valve body 540 (FIGS. 9–13) which is of an irregular shape and is secured by the bolts 416 to the headpiece 410 and the handle 414 at a position between the headpiece 410 and the handle 414 as shown in FIG. 9. The body 540 is formed with two side by side fluid passages 542 and 544 which communicate, respectively, with the passages 448 and 453 and the handle 414. The passage 542, which functions as the main pressure passage during a driving stroke of the piston 420, extends between the handle passage 448 and the inlet passageway 440 in the headpiece 410. The passage 544, which functions as the return passage during a driving stroke of the piston 420, extends between the passage 452 and the passage 444.

The body 540 is formed with an enlarged bore 546 which extends transversely of the passage 542 and has a reduced diameter end portion 548 which communicates with the passage 542. A second bore 550 in the body 540 is positioned alongside the bore 546 and intersects the passage 544. A connecting passage 552 is formed in the body 540 so that it extends between the inner end of the bore 550 and an intermediate portion of the bore 546. A bore 554 in the body 540 extends transversely across the bore 550 and has a reduced inner end portion 556 which communicates with the bore 546 adjacent the end portion 548 thereof.

A hollow plunger member 558, which is sometimes hereinafter referred to as a relief valve member because of its function, is slidably mounted in the bore 546 so that a tapered end portion 560 of the plunger member 558 is engageable with a shoulder 562 formed in the bore 546 at the inner end of the reduced portion 548. The shoulder 562 constitutes a seat for the plunger member 558 which is provided with an annular seal 564 to provide a sealing relation between the plunger member 558 and the bore 546. The plunger member 558 is formed with an enlarged axial cavity 566 which communicates at its inner end with an opening 568 that extends axially through the plunger member 558.

Figure 10:
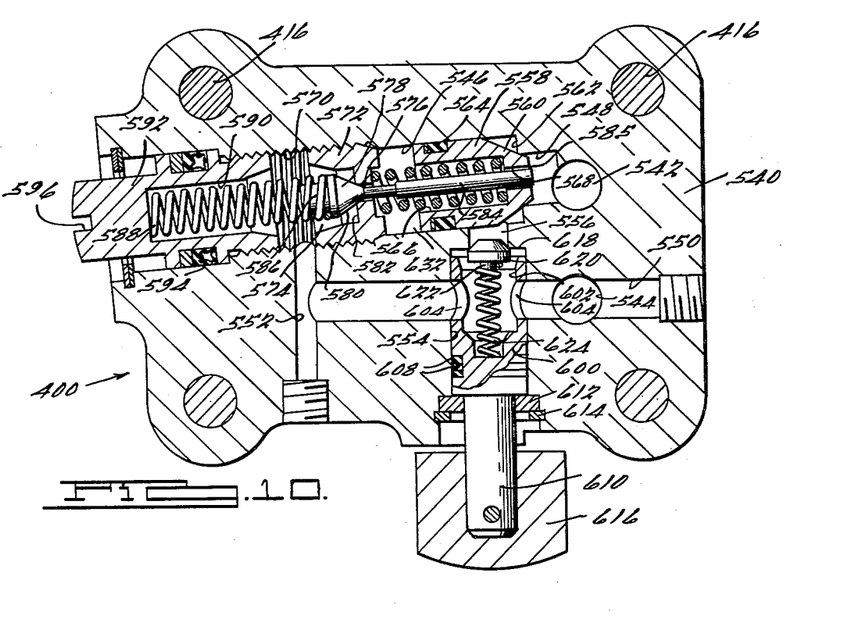
FIG. 10 is an enlarged sectional view of the double drive valve in the tool shown in FIG. 9 looking substantially along the line 10—10 in FIG. 9, showing the valve components in the positions occupied when the tool is not being used to drive a fastener.

Outwardly of the plunger member 558, the bore 546 is formed with an internally threaded section 570 and a seat member 572 is threaded into the bore section 570 to the stop position shown in FIG. 10. A light spring 571 extends between the seat member 572 and the plunger member 558 for biasing the member 558 toward a position engaged with the seat 562. The seat member 572 is formed with an outer axial cavity 574 which communicates with an axial opening 576 extending through the seat member 572. A pilot valve member 578 positioned in the cavity 574 has an annular tapered surface 580 which is engageable with a shoulder 582 at one end of the opening 576 to close the opening 576. On one side, the valve member 578 is formed with an axial stem 584 which extends axially through the cavity 566 in the plunger member 558 and is positioned in the plunger member opening 568. The stem 584 is of a slightly smaller diameter than the opening 568 so that an annular passage 585 is formed in the plunger member 558 surrounding the stem 584. The largest diameter portion of the stem 584 corresponds to the diameter of the opening 576 for a purpose to appear later. On the opposite side, the valve member 578 is formed with a spring centering projection 586. A spring 588 has one end centered on the projection 586 and the opposite end is positioned within a cavity 590 formed in an adjustable plug 592 which is threaded into the bore section 570. The plug 592 carries a seal 594 which engages the bore wall and is formed with a slot 596 for a screw driver or the like so that the plug 592 can be rotated in the bore 546 to adjust the pressure of the spring 588 on the pilot valve member 578.

A valve stem or body 600 is rotatably supported within the bore 554 and is formed with an axial cavity 602 which faces the reduced bore portion 556. A pair of diametrically aligned openings 604 are formed in the stem 554 so that they communicate with the cavity 602. The stem 600 carries seals 608 which engage the wall of the bore 554 and has a reduced diameter outer end portion 610. The stem 600 is maintained in the bore 554 by an annular washer 612 which surrounds the reduced stem portion 610 and is maintained in position by a retaining ring 614. A knob 616 is attached to the outer end of the reduced stem portion 610 for facilitating manual rotation of the stem 600 between the position shown in FIGS. 10, 11 and 12 in which the openings 604 are axially aligned with the bore 550 and the position shown in FIG. 13 in which the openings 604 are out of alignment with the bore 550.

At the outer end of the reduced bore portion 556, the bore 554 is formed with a shoulder 618 which constitutes a seat for a poppet or check valve member 620 which extends into the stem cavity 602 and is formed with a spring centering projection 622. A spring 624, which is a very light spring, is positioned about the extension 622 at one end and at its opposite end is engaged with the stem 600 at the inner end of the cavity 602 for exerting a small force on the check valve member 620 urging it toward a position engaged with the seat 618.

In the operation of the tool 402 to drive a fastener such as the fastener indicated at 252 in FIG. 8, assume that the tool components are in the positions illustrated in FIG. 9 and the parts of the fastener are arranged as shown in FIG. 8. Further assume that only a partial driving of the fastener 252 is desired, in which case the control knob 616 is moved to a position in which an indicating arrow 630 on the knob points to the indicating marks "DD" on the valve body 540 so that the valve parts are in the positions shown in FIG. 10. The tool is applied to the fastener 252 by telescoping the nose assembly 418 over the shank 338 of the fastener pin 326 so that the shank forces the ejector cylinder 488 rearwardly in the collet 472 so that the shank 338 is within the chuck 406 and the anvil 404 engages one end of the fastener collar 348. The trigger 408 is actuated so that the remote power unit operates to pump fluid through the line 450, through the tool handle passage 448, through the main valve passage 542, and the headpiece inlet passageway 440 to the port 442. This supply of fluid to the headpiece bore 412 provides for a buildup of pressure on the rod side of the piston 420 so that the piston is driven toward the right as viewed in FIG. 9. This movement of the piston moves the collet 472 to the right so that the engagement of the shoulder 474 with the chuck 406 contracts the chuck into gripping engagement with the fastener shank 338 to thereby apply a pulling force to the fastener pin 326. The reaction to this pulling force is applied as a swaging force to the fastener collar 348 by the anvil 404.

The purpose of the double drive valve 540 is to limit the pulling force which is applied to the shank 338 to a definite adjustable force. The double drive valve 400 functions to limit the fluid pressure applied to the rod end of the piston 420 tending to move the piston in a direction to apply this pulling force to the fastener in the following manner. Fluid in the main passage 542 flows through the bore portion 548 and the annular passage 584 surrounding the valve stem 584 into a chamber 632 in the bore 546 between the openings 568 and 576. Since the area of the plunger member 558 exposed to the fluid in the chamber 632 is greater than the area of the plunger member 558 exposed to the fluid in the bore portion 548, this fluid in the chamber 632 functions to maintain the plunger member 558 in a seated position. The spring 571 is of a strength sufficient to maintain the plunger member 558 seated during the initial supply of fluid to the bore portion 548, following which the fluid in chamber 632 performs this function. However, the fluid in the bore portion 548 also exerts a force on the end of the valve stem 584 in a direction tending to move the pilot valve member 578 off the shoulder 582 so that fluid can flow from the chamber 632 through the connecting passage 552 and the bore 550 to the return passage 544 which communicates through the handle passage 453 with the line 452 which is connected to tank at the remote power unit.

Figure 11:
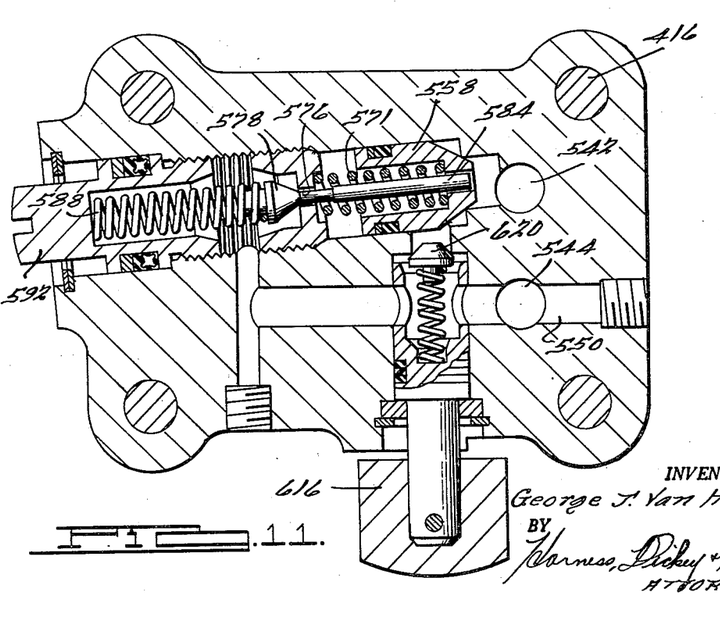
FIG. 11 is a sectional view of the double drive of this invention, illustrated similarly to FIG. 10, showing the valve components in the position these components occupy when the valve is in a "low" pressure position and is first supplied with fluid under pressure.
Figure 12:
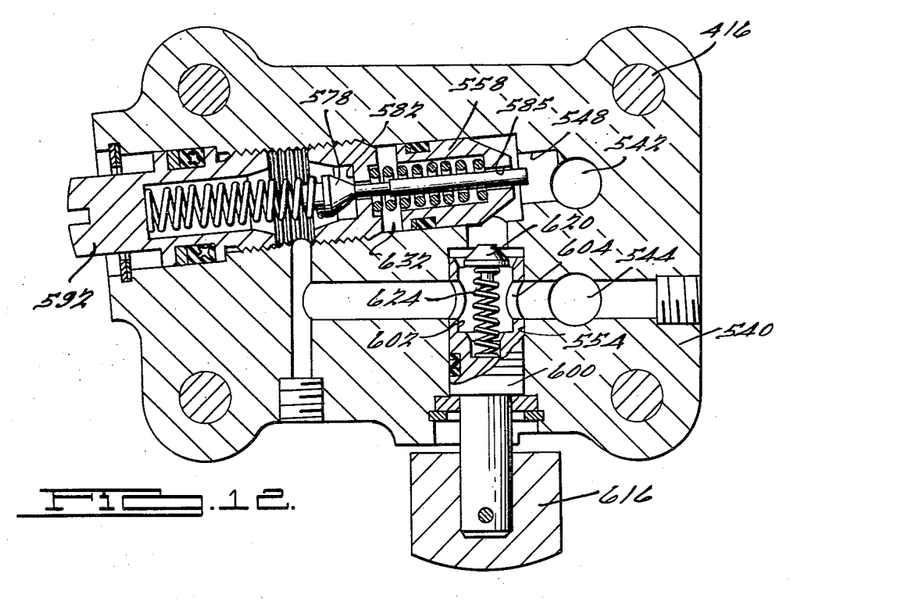
FIG. 12 is a sectional view like FIGS. 10 and 11 showing the valve components in the positions these components occupy when the valve is in a "low" pressure position and is functioning to bypass fluid to tank.

The fluid pressure required in the main passage 542 and the bore portion 548 to move the stem 584 against the action of the spring 588 to unseat the valve member 578 is dependent on the pressure exerted on the valve 578 by the spring 588. When this pressure in the passage 542, which is substantially the same pressure that is present in the headpiece bore 412 on the rod end of the piston 420, becomes sufficiently high, the valve member 578 is unseated as shown in FIG. 11. The opening 576 and the largest diameter of the stem 584 are of the same size to eliminate the influence of fluid pressure in the chamber 632 on the balance of forces between the spring 588 and the fluid force on the valve stem 584. The portion of the stem 584 which extends through the opening 576 is of a reduced diameter to permit fluid flow through the opening 576.

With the valve 578 open as shown in FIG. 11, fluid can flow from chamber 632 to tank so that the pressure of the fluid in the chamber 632 is relieved so that it is below the pressure of the fluid in the bore portion 548. When this pressure differential is great enough, the force of the fluid in the bore portion 548 on the plunger member 558 is sufficient to move the plunger member 558 to the open position shown in FIG. 12. In this position of the plunger member 558, fluid flows from the passage 542, through the bore portion 548 and against the check valve member 620, which opens immediately since it is maintained closed only by the very light spring 624, so that the fluid flows into the valve stem cavity 602 and out of the cavity through an opening 604 into the bore 550 for flow out the return passage 544 to tank. The position of the pilot valve member 578 relative to its seat 582 regulates the pressure in the chamber 632 to in turn regulate the position of the plunger member 558 which regulates the amount of fluid which can be bypassed through the bore 554 to the return passage 544. The amount of fluid which is bypassed in turn determines the pressure of the fluid in the inlet passage 542 which is thus dependent on the pressure of the spring 588 applied to the pilot valve 578. By adjusting the plug 592, the pressure of the spring 588 can be adjusted to adjust the pressure in the inlet passage 542 and provide the desired pressure in the headpiece bore 412 on the rod end of the piston 420 to in turn regulate the pulling force exerted on the collet 472. The magnitude of this force in turn determines the reaction force applied by the anvil 404 to the collar 348 which determines the amount of swaging of the collar 348 which is obtained prior to the stalling of the tool 402. When the maximum pulling force that can be developed with the reduced pressure in the headpiece bore 12 has been applied to the fastener shank 338, the piston 420 cannot move any further toward the right in FIG. 9 and all of the fluid flowing into the valve passage 542 is bypassed to the return passage 544. The wall of the valve stem 600 surrounding the cavity 602 is sufficiently thin to provide for its expansion into sealing engagement with the bore 554 when there is fluid under pressure in the cavity 602. This construction of the valve stem 600 eliminates any danger of leakage around the valve stem 600 into the bore 550.

It can thus be seen that the plunger member 558 functions as a relief valve in that it opens to relieve the pressure in the main passage 542. The pilot valve member 578 and the stem 584 secured thereto operate so that the fluid in the passage 542 is used in holding the plunger member 558 in a closed position until a predetermined pressure has been developed, thereby making it possible to use a much lighter spring 588 than would otherwise be possible. In one embodiment of the invention pressures above 3000 p.s.i. are present in the passage 542 in the position of the valve shown in FIGS. 10, 11 and 12, and the relief valve mechanism in the bore 546 makes it possible for the valve 400 to be of a compact construction capable of handling fluid at pressures of this magnitude.

When the tool 402 stalls on a fastener, the operator actuates the trigger 408 so that the line 452 is connected to tank and fluid is pumped from the remote power unit into the line 450 for travel into the headpiece bore 412 through the port 446 so as to move the piston to the left as viewed in FIG. 9. The tubular collet 472 is moved toward the left to thereby relieve the contracting force on the chuck 406, which is expanded on engagement with the end 486 of the chuck expanding sleeve 482 so that the chuck is released from the fastener shank 338. Fluid under pressure in the headpiece bore 412 is applied to the ejector piston 498 so as to move the ejector rod 492 toward the left in FIG. 9 to in turn move the ejector cylinder 488 to the left into engagement with the end of the shank 338 so as to push it out of the tool nose assembly 418. When the piston 420 has been moved toward the left to its limit position, all of the tool parts have been returned to their positions illustrated in FIG. 9 in which the tool is in readiness for a subsequent fastened driving operation.

During the return stroke of the tool 402, fluid from the remote power unit is directed through the passage 544 and return fluid to the power unit tank flows through the passage 542. Check valve member 620 is closed by the pressure of fluid in passage 544 to prevent this fluid from acting on the relief valve member 558 to open it so that fluid is dumped back to the tank through passage 542.

Figure 13:
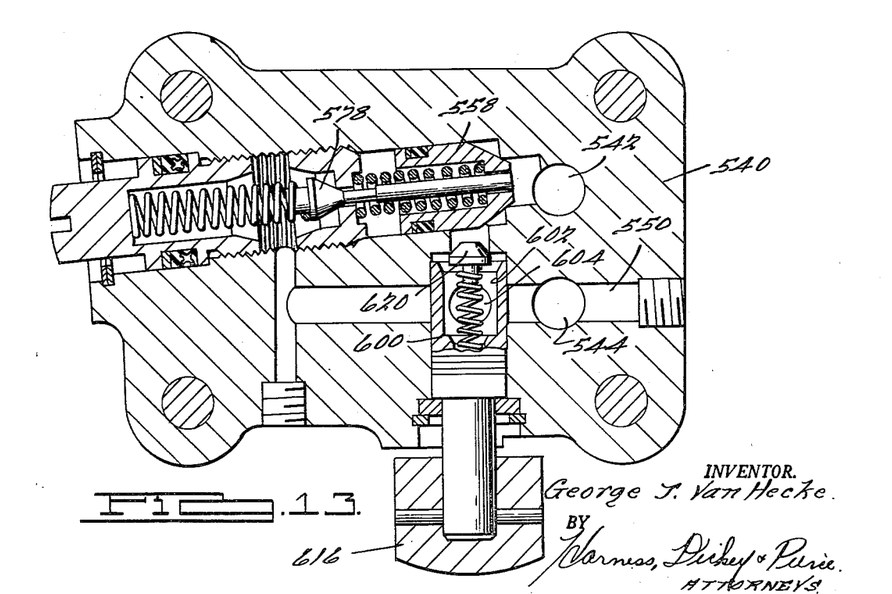
FIG. 13 is a sectional view like FIGURES 10, 11 and 12 showing the valve components in the positions they occupy when the valve is in a "high" pressure position.

In the event it is desired to fully drive a fastener 252 either after the collar 348 has been partially swaged into the fastener locking grooves 342 or prior to any swaging of the collar 348, the tool nose piece 418 is initially telescoped over the fastener shank 338 as previously described and the knob 616 on the double drive valve 400 is rotated about 90 degrees to a position in which the arrow 630 on the knob 16 points to the marking "STD" on the valve body 540. In this position of the knob 616, the stem 600 is in the position illustrated in FIG. 13 in which the openings 604 in the valve stem 600 are spaced about 90 degrees from the bore 550 in the valve body 540. Consequently, none of the fluid flowing into the valve stem cavity 602 can flow out of the cavity. As a result, no matter how high a fluid pressure is developed in the passage 542, none of the fluid in this passage can be relieved through the passage 544. Accordingly, since the double drive valve 400 cannot effect any reduction in the fluid pressure in the headpiece bore 412, a full pressure can be applied to the piston 420 sufficient to apply a pulling force to the fastener shank 338 of a magnitude to fracture the fastener pin 326 at the breakneck groove 344 and fully swage the collar 348 into the locking grooves 342. When the pin fractures at the groove 344, the trigger 408 is actuated to reverse the direction of movement of the piston 420 so that the ejector cylinder 488 operates to eject the broken-off portion of the shank 388 remaining in the chuck 406. Since the fluid pressures equalize in the bore 546 both of the valves 558 and 576 soon close as shown in FIG. 13.

From the above description, it is seen that this invention provides double drive valves 10 and 400 which are mounted directly on their respective tools 12 and 402 for lowering the pressure of the fluid supplied to the tool when a particular operation of the tool is desired. In the illustrated tools, the headpiece bores and the pistons constitute hydraulic piston and cylinder assemblies which are operable to move the anvils and the chucks relative to each other to drive the fastener 252. The valve assembly 10 has a passage therein, consisting of the passageways 214, 216 and 218, and the port 220, which connects the high pressure passage in the valve housing, namely, the opening 167, with the return passage 162, in one position of the movable valve body 202 (FIG. 4). In another position of the valve body 202 (FIG. 3) the connecting passage is blocked by the body 202 so that there is no communication of the main passage 167 and the return passage 162. In the first position (FIG. 4) the valve member 226 constitutes a relief valve for controlling the pressure of fluid in the main passage 167, which fluid flows into the inlet passageway 48 in the tool 12 for actuating the hydraulic cylinder assembly to operate the tool. Similarly, the valve 400 has a passage consisting of the bores 546, 554 and 500 which connects the main passage 542 and the return passage 544 in the position of the valve member 600 shown in FIGS. 10, 11 and 12. In another position of the valve member 600 (FIG. 13), the connecting passage is blocked. In the first position the mechanism in the bore 546 constitutes a relief valve means for controlling the pressure of fluid in the main passage 542.

It will be understood that the specific construction of the improved fastener applying tools and pressure control valves therefor which are herein disclosed and described are presented for purposes of explanation and illustration and are not intended to indicate limits of the invention, the scope of which is defined by the following claims.

I claim:

1. In a fluid motor which includes a body defining a bore, a piston mounted for reciprocation in said bore, means in said body defining a fluid inlet passageway communicating with said bore for delivering fluid having a preselected pressure to the bore for driving the piston in a first direction, a valve housing connected to said body and having a first fluid passage therein connected to said inlet passageway and a second fluid return passage, valve means mounted in said valve housing and selectively operable in one position to establish a fluid path from said first passage to said return passage for diverting a portion of the fluid from said inlet passage for thereby controlling said preselected pressure of fluid entering said inlet passageway from said first passage for driving the piston in said first direction under a different fluid pressure, and adjustable relief valve means in said fluid path selectively adjustable for diverting selected portions of the fluid from said first passage, said relief valve means including a valve member actuable responsively to the fluid pressure in said first passage for diverting selected portions of the fluid from said first passage and adjustable biasing means selectively movable to a plurality of positions for selectively variably biasing said valve member and for selectively varying the pressure at which said valve member is actuable.

2. In a fluid-operated tool for applying fasteners which includes pull means and a swaging anvil, and a piston and cylinder assembly operatively associated with the pull means and the anvil for effecting relative movement therebetween, valve means for controlling the pressure of fluid supplied to said cylinder assembly, said valve means comprising a housing having first passage means therein adapted to be connected to a source of fluid under pressure and to said piston and cylinder assembly, said housing having second passage means therein adapted to be connected to return the fluid to the source, communicating passage means in said housing movable between a first position for communicating both said first and second pasage means and a second position for separating both said first and second passage means, means forming a valve seat in said communicating passage means, and a relief valve member engageable with said valve seat for controlling the pressure of fluid in said first passage means.

3. In a fluid-operated tool for applying fasteners which includes pull means and a swaging anvil, and a piston and cylinder assembly operatively associated with the pull means and the anvil for effecting relative movement therebetween; valve means for controlling the pressure of fluid supplied to said cylinder assembly, said valve means comprising a housing having first passage means therein adapted to be connected to a source of fluid under pressure and to said piston and cylinder assembly, said housing having second passage means therein adapted to be connected to return the fluid to the source, a body in said housing provided with a fluid passageway and movable between a first position in which said passageway extends between both said passage means and a second position in which said body separates both said passage means, relief valve means in said body between said passage means, and means for adjusting said relief valve means for controlling the pressure of fluid in said first passage means in said first position of the body.

4. A tool for driving fasteners comprising pull means, a swaging anvil, and fluid-operable means for effecting relative movement between said pull means and said anvil, a fluid pressure control valve operatively associated with said fluid operable means, said control valve including a main passage adapted to receive fluid under pressure and a return passage communicating with said main passage and adapted to return fluid therefrom to return the fluid to the source, and adjustable valve means associated with said passages for restricting the flow of fluid from said main passage to said return passage to thereby control the pressure of the fluid in said main passage, and means for blocking communication of said main and return passages.

5. A valve assembly comprising a housing having a main passage therein adapted to receive fluid under pressure and a return passage, a body member rotatably mounted on said housing and having passage means formed therein, said body member in one position thereof having the passage means therein arranged to connect said main and return passages and in another position being positioned to block communication of said main and return passages, said body member having a valve seat formed in said passage means, a valve member extending into said passage means, spring means engaged with said valve member so as to urge said valve member toward said valve seat, and means adjustably mounted on said valve housing and engaged with said spring means for adjusting the pressure exerted by the spring means on the valve member.

6. A valve assembly comprising a housing having a main passage therein adapted to receive fluid under pressure and a return passage, a body member movably mounted on said housing and having passage means formed therein, said body member in one position thereof having the passage means therein arranged to connect said main and return passages and in another position being positioned to block communication of said main and return passages, and adjustable valve means in said passage means selectively adjustable for diverting selected portions of the fluid from said main passage to said return passage, said adjustable valve means including a valve member actuable responsively to the fluid pressure in said main passage for diverting selected portions of the fluid from said main passage and adjustable biasing means selectively movable to a plurality of positions for selectively variably biasing said valve member and for selectively varying the pressure at which said valve member is actuable.

7. In a fluid operated tool for applying fasteners which includes pull means and a swaging anvil, a body defining a bore, a piston mounted for reciprocation in said bore and connected to said anvil for moving the anvil in one direction relative to the pull means for driving a fastener and in the opposite direction for returning the anvil, means in said body defining fluid inlet and outlet passageways communicating with said bore and an inlet duct spaced from said inlet passageway, a first valve housing connected to said body and having an inlet port and an outlet port, a first valve mounted on said valve housing and operable in one position to establish a first fluid path from said inlet port to said inlet passageway and a second fluid path from said outlet passageway to said outlet port, said first valve in a second position thereof establishing a third fluid path from said inlet port to said inlet duct for flow therethrough to said bore for moving the piston in a direction to return the anvil, a second valve housing connected to said body and having a return passage therein communicating through said first valve housing with said outlet port and a connecting passage extending between said third fluid path and said inlet duct, and a second valve mounted on said second valve housing and operable to establish a fourth fluid path from said first fluid path to said return passage for diverting a portion of the fluid from said first fluid path to said outlet port in said one position of said first valve member for thereby controlling the pressure of fluid in said first fluid path.

8. In a fluid operated tool for applying fasteners which includes pull means and a swaging anvil, a body defining a bore, a piston mounted for reciprocation in said bore and connected to said anvil for moving the anvil in one direction relative to the pull means for driving a fastener and in the opposite direction for returning the anvil, means in said body defining fluid inlet and outlet passageways communicating with said bore and an inlet duct spaced from said inlet passageway, a first valve housing connected to said body and having an inlet port and an outlet port, a first valve mounted on said valve housing and operable in one position to establish a first fluid path from said inlet port to said inlet passageway and a second fluid path from said outlet passageway to said outlet port, said first valve in a second position thereof establishing a third fluid path from said inlet port to said inlet duct for flow therethrough to said bore for moving the piston in a direction to return the anvil, a second valve housing connected to said body and having a return passage therein communicating through said first valve housing with said outlet port and a connecting passage extending between said third fluid path and said inlet duct, and a second valve mounted on said second valve housing and operable to establish a fourth fluid path from said first fluid path to said return passage for diverting a portion of the fluid from said first fluid path to said outlet port in said one position of said first valve member for thereby controlling the pressure of fluid in said first fluid path, and adjustable valve means in said fourth fluid path.

9. In a fluid motor which includes a body defining a bore, a piston mounted for reciprocation in said bore, means in said body defining a fluid inlet passageway and an outlet passage, means including a first valve carried by said body for establishing a fluid path from said inlet passageway to said bore to drive said piston, a valve housing connected to said body and defining a bore having an inlet port and an outlet port, a second valve slidably mounted in the bore of said housing, said second valve being operable to establish a first fluid path from said inlet port to said inlet passageway and a second fluid path from said outlet passage to said outlet port; and a third valve operable to divert a portion of the fluid from said first fluid path to said outlet port for thereby controlling the pressure of fluid entering said inlet passageway.

10. In a fluid motor which includes a body defining a bore, a piston mounted for reciprocation in said bore, means in said body defining a fluid inlet passageway and an outlet passage, means including a first valve carried by said body for establishing a fluid path from said inlet passageway to said bore to drive said piston, a valve housing connected to said body and defining a bore having an inlet port and an outlet port, a second valve slidably mounted in the bore of said housing, said second valve being operable to establish a first fluid path from said inlet port to said inlet passageway and a second fluid path from said outlet passage to said outlet port; adjustable relief valve means communicating with said first path and said outlet port for controlling the pressure of fluid in said first path.

11. In a fluid motor which includes a body defining a bore, a piston mounted for reciprocation in said bore, means in said body defining a fluid inlet passageway and an outlet passage, means including a first valve carried by said body for successively establishing fluid paths from said inlet passageway to said bore on opposite ends of said piston to drive said piston successively in opposite directions, a first valve housing defining a bore having an inlet port and an outlet port, a second valve slidably mounted in the bore of said housing, said second valve being operable to establish a first fluid path from said inlet port to said inlet passageway and a second fluid path from said outlet passage to said outlet port; a second valve housing arranged between said first valve housing and said body, separate first and second passage means in said housing interposed in said first and second fluid paths, respectively, a valve body in said second housing operable in one position to establish a third fluid path between said first fluid path and said outlet port through said first valve housing, adjustable valve means in said third fluid path, said valve body in another position thereof blocking communication of said first and third fluid paths.

12. In a fluid motor which includes a body defining a bore, a piston reciprocally mounted in one end portion of said bore, a first valve housing fixed to said body in the opposite end portion of said bore and defining a pair of fluid inlet passageways and a pair of fluid outlet passages, fluid circuit means connecting said passageways and said passages with said bore, a first valve carried by said first housing and operable to permit fluid to flow successively from one of said inlet passageways to said bore on opposite ends of said piston to drive said piston in opposite directions and to permit fluid to flow successively from said bore on opposite ends of said piston to one of said outlet passages, a second valve housing carried by said body, said second housing also defining an inlet port and an outlet port, a second valve carried by said second housing, said second valve being operable in one position to establish a first fluid path from said inlet port to said inlet passageway and a second fluid path from said one outlet passage to said outlet port, said second valve being operable in a second position to establish fluid paths from said other inlet passageway to said bore on one side of said piston for moving the piston in one direction and from both of said outlet passages to said outlet port, said first valve providing for fluid communication of said other inlet passageway and one of said outlet passages when said piston has been moved to the end of its stroke in said one direction positioned between said first and second housings, valve means in a third housing operable in one position to divert a portion of the fluid from said first fluid path to said second fluid path and in a second position to maintain said first and second fluid paths separate through said third housing.

13. In a fluid motor which includes a body defining a bore, a piston reciprocally mounted in one end portion of said bore, a first valve housing fixed to said body in the opposite end portion of said bore and defining a pair of fluid inlet passageways and a pair of fluid outlet passages, fluid circuit means connecting said passageways and said passages with said bore, a first valve carried by said first housing and operable to permit fluid to flow successively from one of said inlet passageways to said bore on opposite ends of said piston to drive said piston in opposite directions and to permit fluid to flow successively from said bore on opposite ends of said piston to one of said outlet passages, a second valve housing carried by said body, said second housing also defining an inlet port and an outlet port, a second valve carried by said second housing, said second valve being operable in one position to establish a first fluid path from said inlet port to said inlet passageway and a second fluid path from said one outlet passage to said outlet port, said second valve being operable in a second position to establish fluid paths from said other inlet passageway to said bore on one side of said piston for moving the piston in one direction and from both of said outlet passages to said outlet port, said first valve providing for fluid communication of said other inlet passageway and one of said outlet passages when said piston has been moved to the end of its stroke in said one direction; a third valve housing positioned between said first and second housings, valve means in said third housing operable in one position to divert a portion of the fluid from said first fluid path to said second fluid path and in a second position to maintain said first and second fluid paths separate through said third housing, and an adjustable valve member in said valve means operable to control the amount of said fluid which is diverted.

14. In a fluid-operated tool for applying fasteners which includes pull means and a swaging anvil, a head piece and a piston mounted for reciprocation in said head piece and operatively associated with the pull means and the anvil for effecting relative movement therebetween, valve means for controlling the pressure of fluid supplied to said cylinder assembly, said valve means comprising a housing secured to said head piece and having first passage means therein adapted to be supplied with fluid and communicating with said head piece, said housing having second passage means therein adapted to be connected to return the fluid to the source, communicating passage means in said housing movable between a first position to communicate both said passage means and a second position to separate both said passage means, means forming a valve seat in said communicating passage means, and pressure responsive valve means engageable with said valve seat for controlling the pressure of fluid in said first passage means.

15. A tool for driving fasteners comprising pull means, a swaging anvil, and fluid operable piston and cylinder means for effecting relative movement between said pull means and said anvil, a fluid pressure control valve mounted on said piston and cylinder means, said control valve including a main passage adapted to receive fluid under pressure and a return passage communicating with said main passage and adapted to return fluid therefrom to the source, an adjustable valve means associated with said passages for restricting the flow of fluid from said main passage to said return passage to thereby control the pressure of the fluid in said main passage, and means for blocking communication of said main and return passages.

16. In a fluid-operated fastener applying tool, a pressure control valve comprising a valve body having a first passage adapted to be supplied with fluid from a source and a second passage adapted to return the fluid to the source, passage means in said body connecting said passages, means forming a valve seat in said passage means, a valve member mounted in said body for engagement with said seat, said valve member in the seated position thereof having one side exposed to the fluid in said first passage, passage means in said valve member providing for a flow of fluid from said one side to the opposite side thereof, said valve member being shaped so that the area of said one side is less than the opposite side so that said valve member remains seated until the fluid pressure on said one side is greater than on said opposite side by a predetermined amount, and means in said valve body providing for a relief of the fluid pressure on said one side in response to a predetermined pressure of the fluid in said first passage.

17. A fluid pressure control valve comprising a valve body having a first passage formed therein and adapted to be supplied with fluid from a source and a second passage adapted to return the fluid to the source, passage means connecting said passages, a valve member in said passage means movable between a position in which fluid can flow therethrough from said first passage to said second passage and a position in which said valve member closes said passage means, said body having a chamber formed therein and communicating with said passage means and a valve seat in said passage means, and pressure responsive valve means in said chamber engageable with said seat for closing said passage means in response to a pressure in said first passage below a predetermined pressure.

18. A fluid pressure control valve comprising a valve body having a first passage formed therein and adapted to be supplied with fluid from a source and a second passage adapted to return the fluid to the source, passage means connecting said passages, a first valve member in said passage means movable between a position in which fluid can flow therethrough from said first passage to said second passage and a position in which said valve member closes said passage means, said body having a chamber formed therein and communicating with said passage means and a valve seat in said passage means, a second valve member movably mounted in said chamber for movement toward and away from said seat, said second valve member in the seated position thereof having one side thereof exposed to the pressure of fluid in said first passage and the opposite side to the pressure of fluid in said chamber, said second valve member being shaped so that the area of said one side is less than the area of the opposite side so that said second valve member is maintained seated except when a predetermined pressure differential exists between said first passage and said chamber, passage means communicating said first passage and said chamber, pressure relief passage means adapted to connect said chamber for returning fluid to the source, a pilot valve member movable to a position closing said pressure relief passage means, means urging said pilot valve member toward said position, means associated with said pilot valve member exposed to the pressure of fluid in said first passage so that upon the existence of a predetermined pressure in said first passage said pilot valve member is unseated whereby fluid will flow from said chamber to return to the source to lower the pressure of fluid in said chamber and thereby create said predetermined pressure differential.

19. A fluid pressure control valve comprising a valve body having a first passage formed therein and adapted to be supplied with fluid from a source and a second passage adapted to return the fluid to the source, passage means connecting said passages, a first valve member in said passage means movable between a position in which fluid can flow therethrough from said first passage to said second passage and a position in which said valve member closes said passage means, said body having a chamber formed therein and communicating with said passage means and a valve seat in said passage means, a second valve member movably mounted in said chamber for movement toward and away from said seat, said second valve member in the seated position thereof having one side thereof exposed to the pressure of fluid in said first passage and the opposite side to the pressure of fluid in said chamber, said second valve member being shaped so that the area of said one side is less than the area of the opposite side so that said second valve member is maintained seated except when a predetermined pressure differential exists between said first passage and said chamber, passage means communicating said first passage and said chamber, pressure relief passage means extending between said chamber and said second passage, a pilot valve member movable to a position closing said pressure relief passage means, means urging said pilot valve member toward said position, means integral with said pilot valve member exposed to the pressure of fluid in said first passage so that upon the existence of a predetermined pressure in said first passage said pilot valve member is unseated whereby fluid will flow from said chamber to return to the source to lower the pressure of fluid in said chamber and thereby create said predetermined pressure differential.

20. A fluid pressure control valve comprising a valve body having a first passage formed therein and adapted to be supplied with fluid from a source and a second passage adapted to return the fluid to the source, passage means connecting said passages, a substantially cylindrical valve member in said passage means having an axial cavity and a radial opening communicating with said cavity, said valve member being rotatable between a position in which said radial opening communicates with said second passage means so that fluid can flow through the valve member from said first passage to said second passage and a position in which said radial opening is to one side of said second passage so that said valve member closes said passage means, said valve member having the wall thereof surrounding said cavity of a thickness such that said wall is expandable by the fluid pressure in said cavity into fluid tight engagement with said passage means, and relief valve means in said passage means.

21. In a fluid-operated fastener applying tool, a pressure control valve comprising a valve body having a first passage adapted to be supplied with fluid from a source and a second passage adapted to return the fluid to the source, passage means in said body connecting said passages, means forming a valve seat in said passage means, a valve member mounted in said body for engagement with said seat, said valve member in the seated position thereof having one side exposed to the fluid in said first passage, passage means in said valve member providing for a flow of fluid from said one side to the opposite side thereof, said valve member being shaped so that the area of said one side is less than the opposite side so that said valve member remains seated until the fluid pressure on said one side is greater than on said opposite side by a predetermined amount, and pilot valve means in said valve body providing for a relief of the fluid pressure on said one side in response to a predetermined pressure of the fluid in said first passage.

22. A fluid pressure control valve comprising a valve body having a first passage formed therein and adapted to be supplied with fluid from a source and a second passage adapted to return the fluid to the source, passage means connecting said passages, said body having a chamber formed therein and communicating with said passage means and a valve seat in said passage means, a valve member movably mounted in said chamber for movement toward and away from said seat, said valve member in the seated position thereof having one side thereof exposed to the pressure of fluid in said first passage and the opposite side to the pressure of fluid in said chamber, said second valve member being shaped so that the area of said one side is less than the area of the opposite side so that said second valve member is maintained seated except when a predetermined pressure differential exists between said first passage and said chamber, a passage in said valve member communicating said first passage and said chamber, pressure relief passage means adapted to connect said chamber for returning fluid to the source, a pilot valve member movable to a position closing said passage means, spring means urging said pilot valve member toward said position, means adjustably mounted on said body and engaged with said spring means for adjusting the pressure thereof on said pilot valve member, means integral with said pilot valve member exposed to the pressure of fluid in said first passage so that upon the existence of a predetermined pressure in said first passage said pilot valve member is unseated whereby fluid will flow from said chamber to return to the source to lower the pressure of fluid in said chamber and thereby create said predetermined pressure differential.

23. In a fluid-operated fastener applying tool, a pressure control valve comprising a valve body having a first passage adapted to be supplied with fluid from a source sometimes and at other times connected to return the fluid to the source and a second passage adapted to return the fluid to the source sometimes and at other times to be supplied with fluid source, passage means in said body connecting said passages, means forming a valve seat in said passage means, a valve member mounted in said body for engagement with said seat, said valve member in the seated position thereof having one side exposed to the fluid in said first passage, passage means in said valve member providing for a flow of fluid from said one side to the opposite side thereof, said valve member being shaped so that the area of said one side is less than the opposite side so that said valve member remains seated until the fluid pressure on said one side is greater than on said opposite side by a predetermined amount, means in said valve body providing for a relief of the fluid pressure on said one side in response to a predetermined pressure of the fluid in said first passage, and check valve means in said passage means arranged between said second passage and said valve member.

24. A tool for applying a fastener comprising: pull means for gripping the fastener, anvil means for reacting the pulling force of said pull means, motor means operatively associated with said pull means and said anvil means for applying a relative axial force having a normally preselected maximum magnitude in one direction between said pull means and said anvil means, and motor control means selectively actuable for limiting the magnitude of the relative axial force of said motor means in said one direction to a preselected minimum magnitude.

25. A tool for applying a fastener comprising: pull means for gripping the fastener, anvil means for reacting the pulling force of said pull means, motor means operatively associated with said pull means and said anvil means for applying a relative axial force having a normally preselected maximum magnitude in one direction between said pull means and said anvil means, and motor control means selectively actuable for limiting the magnitude of the relative axial force of said motor means in said one direction to a preselected minimum magnitude, said motor control means including adjustment means selectively adjustable for setting the magnitude of said minimum magnitude of said motor means at a desired level.

References Cited in the file of this patent

UNITED STATES PATENTS

| | | |
|---|---|---|
| 2,525,626 | Stouffer et al. | Oct. 10, 1950 |
| 2,784,700 | Griffith | Mar. 12, 1957 |
| 2,789,539 | Griffith et al. | Apr. 23, 1957 |
| 2,820,566 | Van Hecke | Jan. 21, 1958 |
| 2,928,423 | Rockwell | Mar. 5, 1960 |

FOREIGN PATENTS

| | | |
|---|---|---|
| 624,146 | Great Britain | May 27, 1949 |